Patented Jan. 14, 1941

2,228,986

UNITED STATES PATENT OFFICE 2,228,986

WETTING, DISPERSING, OR EMULSIFYING AGENT

Melvin De Groote, University City, and Bernhard Keiser and Charles M. Blair, Jr., Webster Groves, Mo., assignors, by mesne assignments, to Petrolite Corporation, Ltd., a corporation of Delaware No Drawing. Application February 23, 1938, Serial No. 191,964

12 Claims. (Cl. 252—356)

This invention relates to new products adapted for use as wetting, dispersing or emulsifying agents. It relates more particularly to new products including in admixture tertiary alkylolamines having more than one alcoholic hydroxyl group partially esterified by higher fatty acids and polyhydric alcohols partially esterified by higher fatty acids; and it includes not only these new products, but also a new process for their production. The new products of the invention are stable, are highly effective in acid solution, and show a marked resistance to alkalies.

The new compositions of the present invention contain the two characteristic components in more or less widely varying proportions, and may contain other constituents. They are characterized by their content of a substantial proportion of an alkylolamine, partially esterified by a higher fatty acid, represented by the formula

in which $R_1$, $R_2$ and $R_3$ are alkyl groups or substituted alkyl groups, which may be the same or different, at least one of which has at least one $R_4COO$ substituent, ($R_4$ representing the long carbon-linked chain of a higher fatty acid) and at least one of which has at least one OH (alcoholic hydroxyl) substituent, compounds having an $R_4COO$ substituent and an OH substituent in the same substituted alkyl group, with the other alkyl groups substituted or unsubstituted, being included, together with a substantial proportion of a polyhydric alcohol partially esterified by a higher fatty acid.

The new compositions may be prepared in various ways. One advantageous method of preparing them involves the simultaneous alcoholysis or re-esterification of such esters of higher fatty acids as the natural fats or oils (triglycerides) or di-esters of ethylene glycol or the like with tertiary alkylolamines having more than one alcoholic hydroxyl and a polyhydric alcohol, in proportions such that after the alcoholysis or re-esterification, there will be in the reaction a substantial proportion of partially esterified alkylolamine having at least one free alcoholic hydroxyl group in the amine nucleus and a substantial proportion of partially esterified polyhydric alcohol, which latter may include mono and diglycerides as well as the products resulting from the partial esterification of the polyhydric alcohol used in the reaction, such as glycerin, ethylene glycol, polyglycols or polyglycerols, etc. In this specification and the appended claims, the term "amine nucleus" is used to designate that portion of the molecule of the amine ester which is linked through a carbon atom or carbon atoms to one or more RCOO groups; the term "higher fatty acid" is used to designate those carboxylic acids, generally having at least twelve carbon atoms, which occur in natural oils, fats and waxes, or modifications thereof such as occur in blown or bodied oils; and the term "polyhydric alcohol" is used to designate those alcohols having more than one hydroxyl group, including glycerin, ethylene glycol, diethyleneglycol, propyleneglycol, polyglycerols, polyglycol ethers, glycol-glycerol ethers, polyglycerol-glycol ethers, polyglycol-glycerol ethers, other polyalkylene ethers having a plurality of hydroxy groups, etc.

In general, such alcoholysis or re-esterification is readily carried out by heating the fatty acid ester, the tertiary alkylolamine and the polyhydric alcohol to temperatures in excess of 100° C., but below the temperature at which decomposition takes place. No added catalyst is required. Advantageously, temperatures ranging from 150 to 180° C. are used. In the reaction which takes place, no water is formed, and no water is available for the hydrolysis of any of the esters with liberation of free fatty acid, which might react to form simple salts of the free fatty acid with the amine. It will be noted that in this process, partially esterified polyhydric alcohols are produced from polyhydric alcohols and fully or more completely esterified polyhydric alcohols without the use of such catalysts as phosphates, hydroxides, or other similar alkalies.

The new products may also be readily produced by the admixture of a suitable partially esterified polyhydric alcohol, such as one or more of those referred to above, with an ester or esters of a tertiary alkylolamine having one or more free hydroxyl groups in the amine nucleus, produced, for example, as described in our copending application Serial No. 180,993, filed December 21, 1937, by the alcoholysis of a fatty acid ester with a tertiary alkylolamine, the two reactants being used in proper proportions as described in said application. Admixtures so produced will be free from the simple salts or soaps of the fatty acid and the amine. The partially esterified polyhydric alcohol may be produced by any of the known methods for producing the so-called super-glycerinated fats, mono or diglycerides, etc.

Other methods may be used for producing the new compositions, although in some cases the products produced will not have all the advantages of the products produced by the processes outlined above. For example, a suitable fatty acid may be condensed with a tertiary alkylolamine at relatively high temperatures, with the production of a product containing a substantial proportion of the ester or esters of the fatty acid and the tertiary alkylolamine admixed with the salt or soap of the alkylolamine with the fatty acid; and the resulting product may then be admixed with a suitable proportion of a partially esterified polyhydric alcohol. This method is satisfactory if the presence of the simple salt or soap of the fatty acid and the alkylolamine in the final product is unobjectionable; but it should be avoided if a product is desired having a very high stability in the presence of acids, as the simple salts or soaps tend to decompose in such solution.

When the new process outlined above, involving the simultaneous alcoholysis or re-esterification of a fatty acid ester with a tertiary alkylolamine and a polyhydric alcohol is used, the partially esterified alkylolamine in the resulting product will be in the form of the free base. In general, it will be advantageous to convert this free base into one of its salts, and to use the compositions in neutralized form. The basic constituent of the new compositions is the partially esterified tertiary amine, which forms salts with acids by simple addition. Preferably, this base is converted to the acetate by the addition of the stoichiometrical proportion of acetic acid to the reaction product obtained by subjecting the alkylolamine, the fatty acid ester and the polyhydric alcohol to high temperatures, but instead of using acetic acid for the neutralization of the reaction product, other organic acids, such as propionic acid, butyric acid, lactic acid, citric acid, or the like may be used, or inorganic acids, such as hydrochloric acid, nitric acid, sulfuric acid, phosphoric acid, or other inorganic acids may be used. To produce products for special functions, higher fatty acids, such as those derived from any of the common vegetable or animal oils may be used to neutralize the product, with the production of the higher fatty acid salts or soaps of the esterified amines. It must also be understood that the new compositions, instead of being used in neutralized form, may be used in unneutralized form, advantageously in acid solution, in which they are quite stable and readily disperse. In the specification and the appended claims, the term "ester of a tertiary alkylolamine" is used to designate not only the esters in the form of free bases, but also their salts or neutralized products.

Even where the compositions are produced by the admixture of a partially esterified polyhydric alcohol with the product resulting from heating a free fatty acid and a tertiary alkylolamine to high temperatures, it will be found advantageous to neutralize the product. When a free fatty acid and a tertiary alkylolamine are heated together to high temperatures, the reaction involved is quite complex, but apparently it involves an initial reaction between the amine and the fatty acid to form a simple soap or salt, a portion of which is subsequently rearranged and condensed at the high temperatures to form the ester of the free base, with elimination of water, so that the resulting product contains a mixture of the simple salt or soap of the amine and the fatty acid and esters of the amine and the fatty acid. Such a product will necessarily be partly in the form of the free base, unless the fatty acid has been used in such large proportions as to completely esterify and neutralize the amine, and such portion of the product as is in the form of the free base is advantageously neutralized when used in the new compositions of the present invention.

Among the tertiary amines which may be used in the production of the new products of the present invention are a wide range of tertiary alkylol and tertiary alkylamines. It is understood that the terms "alkylol" and "alkyl" are used conventionally in chemistry to refer to the long chain paraffin compounds which are non-cyclic and aliphatic in nature. We have found, however, that the alicyclic-hydroxyalicyclic, the hydroxy-alicyclic, and the alkyl hydroxy-alicyclic amines are, with respect to their reaction with esters of higher fatty acids, and with respect to the nature of the products produced by such reaction, similar to the corresponding alkyl and alkylol radicals present. For this reason, for the purpose of describing the present invention only, it is understood that the terms "alkyl" and "alkylol" include within their scope, alicyclic and hydroxy-alicyclic groups. The two essentials are that the alkylolamine contain at least two alcoholic hydroxyl groups, which may be attached to the same or different carbon chains, and be a tertiary amine, that is, with three alkyl or alkylol groups linked through a carbon atom to the nitrogen atom. Included among the suitable amines are triethanolamine, diethanolalkylamines, such as diethanolethylamine, diethanolpropylamine, etc., tertiary glyceryl amines, such as tri-dihydroxypropylamine, dihydroxypropyldialkylamines, such as dihydroxypropyldiethylamine, di-dihydroxypropylalkylamines, diethanolmethylamine, tripropanolamine, dipropanolmethylamine, cyclohexanoldiethanolamine, di-cyclohexanolethylamine, etc. All such products may be readily prepared by known processes, and all of them are tertiary amines having at least two alcoholic hydroxyl groups, thus being adapted to form esters with higher fatty acids, such esters having at least one free hydroxyl group. Typical of the amines which may be used are the following:

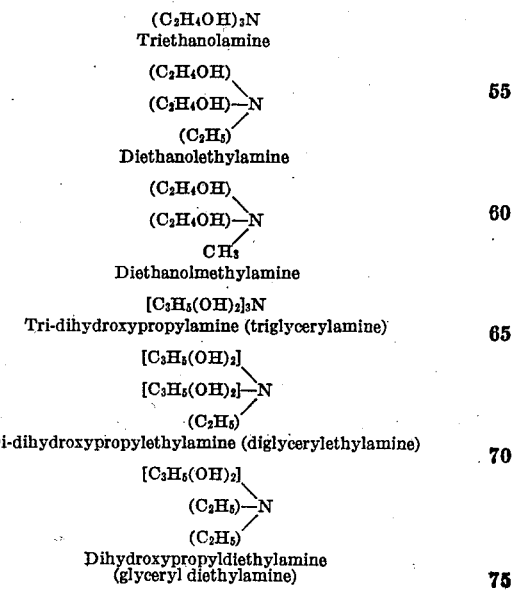

(C₃H₆OH)₃N
Tripropanolamine (C₃H₆OH)
(C₃H₆OH)—N
(C₂H₅)
Dipropanolethylamine

[C₃H₅(C₆H₅)OH]
[C₃H₅(C₆H₅)OH]—N
(C₂H₅)
Di-phenylpropanolethylamine (C₂H₄OH)
(C₂H₄OH)—N
(C₆H₁₀OH)
Cyclohexanoldiethanolamine (C₆H₁₀OH)
(C₆H₁₀OH)—N
(C₂H₅)
Dicyclohexanolethylamine (C₄H₈OH)₃N
Tributanolamine (C₄H₈OH)
(C₄H₈OH)—N
(C₂H₄OH)
Dibutanolethanolamine (C₄H₈OH)
(C₄H₈OH)—N
CH₃
Dibutanolmethylamine Any of the available polyhydric alcohol esters of the higher fatty acids may be used in the production of the new compositions, in accordance with the new method outlined above. It is advantageous to use the naturally occurring triglycerides because of their availability and cheapness; but such esters as the distearic or dioleic acid esters of ethylene glycol, etc., may be used. The triglycerides which may be used include such vegetable oils as cocoanut and palm kernel oil, olive oil, castor oil, palm oil, peanut oil, the drying and semidrying oils such as corn oil, rape seed oil, soya bean oil, sun-flower seed oil, linseed oil, perilla oil, etc., as well as the animal and marine oils, such as tallow, sardine oil, menhaden oil, etc. Blown or bodied oils, such as blown castor oil, blown rape seed oil or perilla oil, bodied linseed oil, etc., may also be used, these oils having properties somewhat different from those of the original oils from which they were derived. Castor oil and blown castor oil produce products having somewhat special characteristics, as due to the presence of oxygen in the long hydrocarbon chain characteristic of the fatty acids, the alkylolamine esters having decreased solubility in hydrocarbon oils, and increased solubility in aqueous media. Thus the mono-ricinoleic acid ester of triethanolamine, for example, is quite insoluble in hydrocarbon oils, but dissolves in dilute acid solutions, or forms salts, for example, with acetic acid, which yield clear solutions in water. Products derived from cocoanut and palm kernel oils, which are characterized by having fatty acids with relatively short hydrocarbon chains, such as lauric acid, for example, the mono-acid ester of triethanolamine derived from triethanolamine and cocoanut oil, have outstanding advantages for use with hard water containing calcium or magnesium salts, as they do not readily form insoluble precipitates in such hard waters.

Outstanding properties of the new products are their marked stability in acid solution, the fact that they retain their high foaming, wetting, and emulsifying properties in the presence of acids, and their marked resistance to alkalies. We believe that the stability and foaming, wetting and emulsifying properties in the presence of acids follows from the fact that the surface-active ion of the amine portion of the new compositions is the cation; and where the compositions are intended for use in acid solution, it is a decided advantage to prepare them in such a way as to prevent the presence of simple salts or soaps of the amine and the higher fatty acids in the product. We believe the resistance of the new compositions to alkalies is due to the inclusion of the partially esterified polyhydric alcohol.

In forming the new products by reaction of a tertiary alkylolamine, an ester of a higher fatty acid, and a polyhydric alcohol, such as glycol or glycerin, the proportions of the fatty acid ester, the alkylolamine, and the polyhydric alcohol should be such that the fatty acid ester is equivalent to, from the fatty acid standpoint, or can esterify, by alcoholysis or re-esterification, but a portion of the alcoholic hydroxyl groups of the amine and a portion of the alcoholic hydroxyl groups of the polyhydric alcohol, including that combined in the original fatty acid ester used, so that the final product obtained is a mixture of partially esterified amine, having at least one alcoholic hydroxyl in the amine nucleus, and partially esterified polyhydric alcohol, containing at least one alcoholic hydroxyl in the partially esterified polyhydric alcohol. Substantially the same product may be prepared by the reaction of a partially esterified polyhydric alcohol, such as a mono or diglyceride, with a tertiary alkylolamine, using an excess of the partially esterified polyhydric alcohol, and permitting the alcoholysis or re-esterification to go only partially to completeness, so that the product obtained is a mixture of partially esterified alkylolamine and initial partially esterified polyhydric alcohol, and undoubtedly includes a substantial amount of free polyhydric alcohol, which may be removed by washing or the like if desired.

The invention will be illustrated by the following specific examples, but it is not limited thereto.

*Example 1.*—Commercial triethanolamine, cocoanut oil and glycerin the proportions of 1 mole of cocoanut oil to 3 moles of triethanolamine and at least 1 mole of glycerin are heated to a temperature of between about 150 and 180° C. for a period of about 2 hours. The resulting product contains substantial amounts of the mono-fatty acid ester of triethanolamine and the mono and di-fatty acid esters of glycerin, with minor proportions of the initial cocoanut oil, glycerin, and unreacted triethanolamine. The amine portion of the reaction product is advantageously converted into the acetate, by the addition of 3 moles of glacial acetic acid, forming a salt which is readily dispersible in water. Of course, instead of using acetic acid for neutralizing the product, other acids, such as those referred to above, may be used. The product has extremely good wetting, emulsifying and detergent properties, is highly effective in acid solution, is highly resistant to alkalies, and is very useful in hard water, as it is not readily precipitated by calcium or magnesium salts.

*Example 2.*—Triglycerylamine (tri-dihydroxypropylamine) and castor oil are reacted in the proportions of 3 moles of castor oil to 2 moles of triglycerylamine, with the production of a product consisting predominantly of the di-ricinoleic acid ester of the triglycerylamine. To this product is added a substantial proportion, for example, about 50%, of the mono-ricinoleic acid ester of glycerin. Advantageously the triglycerylamine ester is neutralized, as by the addition of 2 moles of a suitable acid, such as acetic acid, before the addition of the mono-glyceride. The product has excellent wetting, emulsifying and detergent properties.

Example 3.—Palm kernel oil and diethanolethylamine, in the molecular proportions of 3 moles of the amine to 1 mole of the oil, are heated together with 1 mole of a polyglycerol to a temperature between about 150° and 180° C. for about 2 hours, with the production of a reaction product containing substantial amounts of the mono-ester of the diethanolethylamine and of super-glycerinated oil.

Example 4.—Commercial triethanolamine and a fatty oil, in the molecular proportions of 3 moles of the amine to 1 mole of the oil are heated together with 1 mole of ethylene glycol to a temperature between about 150 and 180° C. for about 2 hours, with the production of a reaction product containing substantial amounts of the mono-ester of the triethanolamine together with substantial amounts of partially esterified glycerin and ethylene glycol.

Example 5.—The mono-ricinoleic acid ester of glycerin and triglycerylamine are heated together to temperatures between about 150 and 180° C. for about 2 hours in the proportions of 2 moles of the mono-ricinolein to 1 mole of the triethanolamine, with the production of a product containing substantial amounts of mono-ricinolein, the mono-ricinoleic acid ester of triethanolamine, and glycerin. If, instead of mono-ricinolein, di-ricinolein be used in somewhat lesser proportions, a corresponding product is obtained containing substantial amounts of unchanged di-ricinolein, together with a minor, and in general insignificant, amount of mono-ricinolein.

It has been heretofore pointed out that for the purpose of describing the present invention, the terms "alkyl" and "alkylol" are to be construed as including alicyclic and hydroxyalicyclic groups which behave in a manner similar to the alkyl and alkylol groups with respect to reactions involved in the present invention. It is to be understood that aralkyl and hydroxyaralkyl groups are similarly included provided their linkage to the nitrogen atom is through a side chain carbon and provided, in the case of the hydroxyaralkyl groups, the hydroxy group is attached to a side chain carbon. Aralkyl or hydroxyamines, which may be used in the production of the new products of the present invention may be produced, for example, by reaction between such compounds as the chlorethanolamines and aromatic compounds such as benzene or naphthalene, with replacement of the halogen by the aryl group and the production of aralkyl or hydroxyaralkylamines, such as monophenyl or diphenyltriethanolamine or mononaphthyl or dinaphthyltriethanolamine.

We claim:

1. Compositions, an essential constituent of which is a mixture of a higher fatty acid ester of a tertiary alkylolamine, said ester having at least one alcoholic hydroxyl group in the amine nucleus, and a polyhydric alcohol partially esterified by a higher fatty acid, said partially esterified polyhydric alcohol having at least one free alcoholic hydroxyl group.

2. Compositions, an essential constituent of which is a mixture of a compound of the class consisting of mono- and di- higher fatty acid esters of triethanolamine and a polyhydric alcohol partially esterified with higher fatty acids.

3. Compositions, an essential constituent of which is a mixture of a higher fatty acid ester of a tertiary alkylolamine, said ester having at least one alcoholic hydroxyl group in the amine nucleus and a higher fatty acid ester of glycerin having at least one of the hydroxyl groups of the glycerin molecule free.

4. A composition, an essential constituent of which is a mixture of a super-glycerinated fat and a higher fatty acid ester of a tertiary alkylolamine having at least one alcoholic hydroxyl group in the amine nucleus.

5. Compositions as in claim 1, which are substantially free from salts of the tertiary alkylolamine with higher fatty acids.

6. Compositions, an essential constituent of which is a mixture of a compound of the formula

in which $R_1$, $R_2$ and $R_3$ are alkyl groups at least one of which is substituted by an $R_4COO$ group, in which $R_4$ represents the long carbon-linked chain characteristic of a higher fatty acid, and at least one of which is substituted by an OH group, and a compound of the formula $R_4COOX$ in which $R_4$ represents the long-carbon linked chain characteristic of a higher fatty acid and X represents a polyhydric alcohol residue having at least one free OH group.

7. The process of producing compositions adapted for use as wetting, emulsifying and detergent agents, which comprises heating an ester of a higher fatty acid with a tertiary alkylolamine having more than one alcoholic hydroxyl group and a polyhydric alcohol in proportions such that, after the resulting alcoholysis or re-esterification, there is at least one free alcoholic hydroxyl group in the amine nucleus of the amine portion of the reaction product and a substantial proportion of a partially esterified polyhydric alcohol in the resulting product.

8. The process of producing compositions adapted for use as wetting, emulsifying and detergent agents, which comprises heating in excess of 100° C. an ester of a higher fatty acid with a tertiary alkylolamine having more than one alcoholic hydroxyl group and a polyhydric alcohohol in proportions such that, after the resulting alcoholysis or re-esterification, there is at least one free alcoholic hydroxyl group in the amine nucleus of the amine portion of the reaction product and a substantial proportion of a partially esterified polyhydric alcohol in the resulting product.

9. The process of producing compositions adapted for use as wetting, emulsifying and detergent agents, which comprises heating a naturally occurring triglyceride with glycerin and a tertiary alkylolamine having more than one alcoholic group in proportions such that, after the resulting reaction, there is at least one free alcoholic hydroxyl group in the amine nucleus of the amine portion of the reaction product and a substantial proportion of partially esterified glycerin in the resulting product.

10. The method of producing partially esterified polyhydric alcohols which comprises heating a polyhydric alcohol and an esterified polyhydric alcohol in the presence of an alkylolamine.

11. The method of producing mono- and diglycerides of higher fatty acids which comprises heating glycerin and a triglyceride in the presence of an alkylolamine.

12. The method of producing mono- and diglycerides of higher fatty acids which comprises heating glycerin and a triglyceride in the presence of triethanolamine.

MELVIN DE GROOTE.
BERNHARD KEISER.
CHARLES M. BLAIR, Jr.